UNITED STATES PATENT OFFICE.

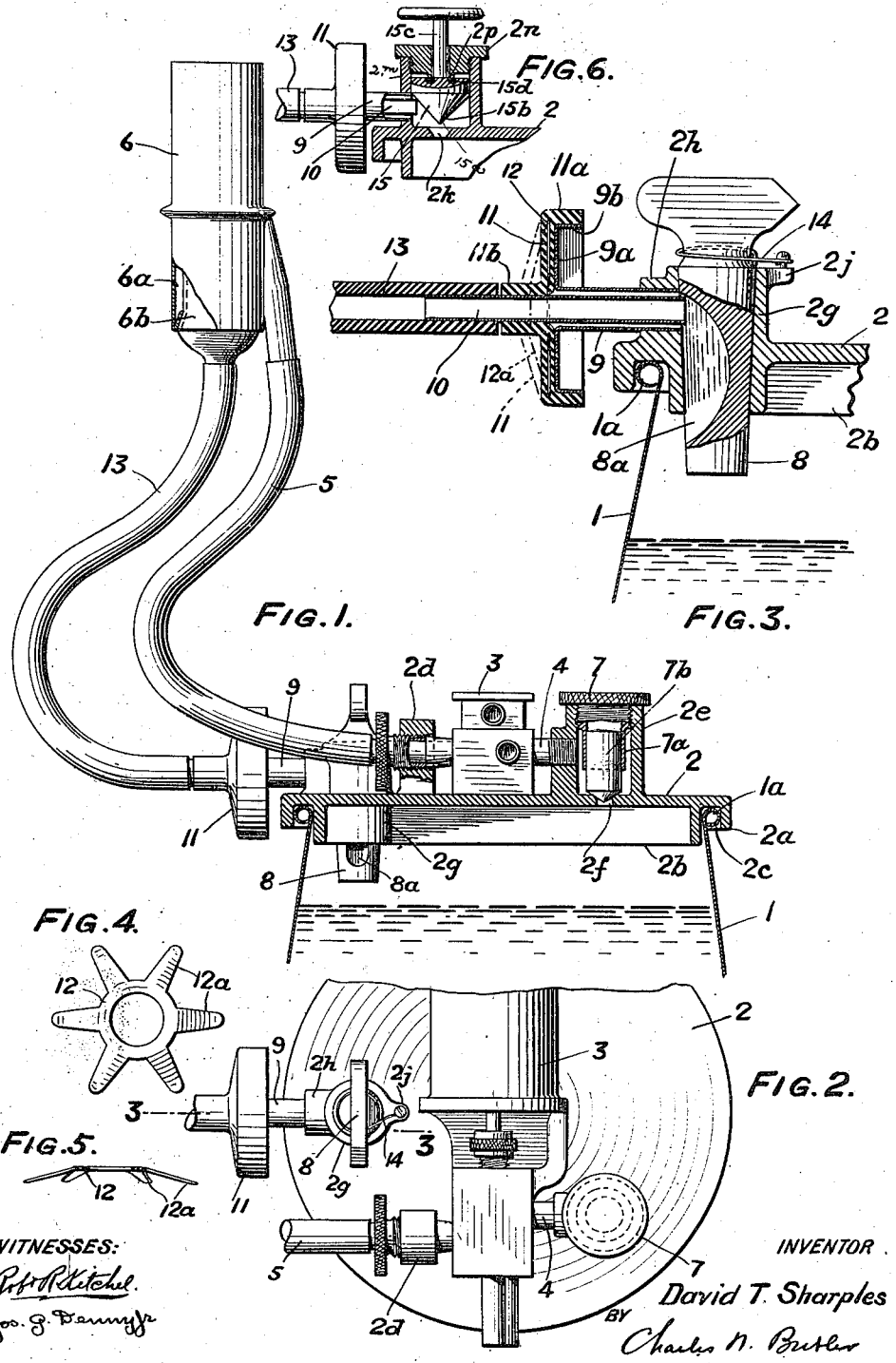

DAVID TOWNSEND SHARPLES, OF WEST CHESTER, PENNSYLVANIA.

MILKING MECHANISM.

976,305.  Specification of Letters Patent.  Patented Nov. 22, 1910.

Application filed February 5, 1910. Serial No. 542,167.

*To all whom it may concern:*

Be it known that I, DAVID T. SHARPLES, a citizen of the United States, residing at West Chester, in the county of Chester and State of Pennsylvania, have invented certain Improvements in Milking Mechanism, of which the following is a specification.

This invention relates to milking mechanism for automatically cutting off suction through the milk tube and sealing the pail when the teat cup is separated from the teat and when the pail is full, the pail being automatically sealed when the interior of the tube is opened to atmospheric pressure or when the pressure therein rises above the normal milking pressure.

A desideratum attained by my improved mechanism is the protection of the milk from contamination by the exclusion of foreign matters, which are commonly drawn into and through the milk tube by suction continued therein after the cup has dropped from the teat or while it is being carelessly handled.

A further desideratum effected is the preservation in the system of the vacuum necessary to continue the milking operations through other teat cups by preventing the admission of air to the system upon the disengagement of one or more of the cups or the admission of air to their milk tubes.

A further desideratum attained is the automatic checking of the milking operation and the signaling of the operative when the pail is full.

A further desideratum resulting from the operation is the automatic maintenance of a partial vacuum within the pail, by means of which the cover is maintained in sealed relation to the body of the pail.

The features characteristic of the improvements are more fully disclosed in the following description and the accompanying drawings in illustration thereof.

In the drawings, Figure 1 is a sectional elevation of the top of a milk pail having my improvements applied thereto; Fig. 2 is a top plan view of a section of the pail; Fig. 3 is an enlarged sectional view on the line 3—3 of Fig. 2 representing characteristic details of the invention; Fig. 4 is a plan view of a form of spring used in the construction; Fig. 5 is a cross section of the same, and Fig. 6 is a sectional elevation representing a form of valve which may be substituted for that shown in Fig. 3.

The pail 1, having the rim $1^a$, is provided with the cover 2 having the depending annular flanges $2^a$ and $2^b$ forming the channel $2^c$ which engages the rim.

The cover has engaged thereon, between the bearing $2^d$ and the valve box $2^e$ formed therewith, the pulsator 3 which is connected by the vacuum nipple 4 with the box $2^e$ and by the pressure and vacuum pipe 5 with the inclosed compartment $6^a$ of the teat cup 6.

A screw cap 7, for closing the top of the box $2^e$, is provided with a barrel $7^a$ forming a vertical way for guiding a puppet valve $7^b$ which controls the exhaust port $2^f$ in the cover.

A valve seat $2^g$ is comprised in the cover and a conical valve 8 is revoluble therein, the valve having the port $8^a$ formed therein, (as shown in Figs. 1, 2, and 3.)

A nipple or short tube 9 is set in a socket $2^h$ which extends through the valve casing or seat $2^g$, the tube having therein the disk $9^a$ provided with the cylindrical flange $9^b$. A tube 10 extends through the tube 9, in which it has free play and with which it is connected by a flexible rubber diaphragm, the latter comprising a disk like body 11 having thereon a cylindrical flange $11^a$ tightly engaged on the flange $9^b$ and an oppositely extending cylindrical flange $11^b$ tightly engaged on the part of the tube 10 exterior to the tube 9. The body 11 has embedded therein or fixed thereto a dished spring comprising the body 12 concentric with the flange $11^b$ and the resilient fingers $12^a$ which project therefrom, the spring acting to withdraw the part 11 to its dotted position.

A flexible suction tube 13 connects the end of the reciprocating tube 10, which extends beyond the part $11^b$, with the inner compartment $6^b$ of the teat cup.

A spring 14 is coiled on the top of the valve 8 and has one end fixed thereto while the other end is fixed to the anchorage $2^j$.

The function of the spring 14 is to turn the valve 8 and cut off the communication of the port $8^a$ with the tubes 9 and 10; a function of the tube 10 is to hold the valve 8 against the action of the spring 14 by moving into the port $8^a$ to hold it in registration with the tubes 9 and 10, and a function of the spring 12 is to withdraw the tube 10 from engagement with the port $8^a$ and permit the spring 14 to turn the valve 8, thereby cutting off suction through the tube 13 and sealing the pail's passage by way of this valve.

In operation, suction through the nipple 4 effects the rise of the automatically closed valve 7ᵇ (loosely fitted in the way 7ᵃ) and exhaustion of air through the port 2ᶠ from the interior of the pail 1. The cup 6 being applied to the teat and the valve 8 manually opened against the action of the spring 14, the air is exhausted simultaneously from the space between the tubes 9 and 10 and from the interior of the tubes 10 and 13. A partial vacuum having been created thus between the disk 9ᵃ and the part 11, the external pressure of the atmosphere moves the part 11 against the action of the spring 12 from the dotted line to the full line position shown in Fig. 3, the tube 10 being moved thereby into the port 8ᵃ and holding the valve open. When the cup 6 drops or is otherwise withdrawn from the teat and air is admitted through the tubes 13 and 10 to the space between the tubes 9 and 10, the spring 12 moves the part 11 to the dotted line position and withdraws the tube 10 from the port 8ᵃ, whereupon the spring 14 closes the valve 8.

When the milk, exhausted from the teat through the tube 13 to the pail, rises in the latter so that the port 8ᵃ is sealed thereby, and suction through this tube is cut off, the pressure in the tube rises and the closure of the valve 8 is effected.

As the valve 7ᵇ automatically closes the port 2ᶠ when the valve 8 is closed a vacuum is maintained within the pail.

As illustrated in Fig. 6, the cover 2 is provided with the port 2ᵏ and the valve box 2ᵐ having thereon the cap 2ⁿ. The tube 9 is set in this box and the tube 10, connected with the tube 9 as shown in Fig. 3, is adapted to project into the box. A valve 15, having the body 15ᵃ which fits the box and the conical point 15ᵇ which is adapted for closing the port 2ᵏ, is provided with the stem 15ᶜ movable through the cap 2ⁿ. A flange 2ᵖ on the cap engages the packing 15ᵈ of the valve to prevent the admission of air through the cap.
Upon lifting the valve 15 and exhausting air through the port 2ᵏ, from within the tubes 9, 10 and 13, the diaphragm 11 collapses and the tube 10 is projected into the casing to engage the body of the valve 15, whereby the latter is held elevated. When the pressure in the tubes rises above normal milking pressure, the diaphragm springs out to its normal position, the tube 10 is withdrawn and the valve 15 drops, closing the port 2ᵏ.

Having described my invention, I claim:

1. In a milking mechanism, a receptacle, a suction tube connected therewith, means for exhausting air from said receptacle, and means automatically operating to cut off the communication from said tube to said receptacle upon the admission to said tube of pressure above normal milking pressure.

2. In a milking mechanism, a receptacle, means for exhausting air therefrom, a suction tube exhausted by said means through said receptacle, a valve mechanism controlling communication between said tube and receptacle, the communication between said tube and receptacle through said valve mechanism being sealed by the rise of liquid in said receptacle and automatic means actuated to hold said valve open by the reduction of the pressure within said tube and to permit said valve mechanism to close upon the rise of pressure in said tube.

3. In a milking mechanism, a pail, a pail cover having a port therein, means for exhausting air from said pail through said port, a valve opened by suction and automatically closing said port, a suction tube connected with said cover, an automatically closing valve adapted for controlling communication between the interior of said pail and said tube, means for holding said valve open, and automatic pressure mechanism whereby said valve is released.

4. In a milking mechanism, a pail, a suction tube communicating with said pail, an automatically closing valve for controlling communication between said pail and tube, and means actuated by unbalanced atmospheric pressure resulting from the exhaustion of air from said tube for holding said valve in the open position.

5. In a milking mechanism, a pail, a suction tube, a teat cup connected therewith, an automatically closing valve for controlling communication between said tube and pail, a reciprocating device adapted for holding said valve in the open position, and automatically operating means for effecting the release of said valve.

6. In a milking mechanism, a pail, a valve, means for exhausting air from said 11 pail, a reciprocating conduit communicating with said pail under control of said valve, a stationary conduit exterior to said reciprocating conduit and communicating with said pail under control of said valve, and a flexi- 11 ble diaphragm connecting said conduits and adapted to be operated by atmospheric pressure to cause said first conduit to engage said valve upon reducing the pressure in said conduits. 12

7. In a milking mechanism, a pail, means for exhausting air from said pail, a valve having a port communicating with the interior of said pail, a conduit with which said port is adapted to communicate, means for 1 automatically operating said valve to close communication between said port and conduit, a second conduit, a resilient diaphragm connecting said conduits, said diaphragm being collapsible by atmospheric pressure 1 when a partial vacuum is created in said conduit, and means operated by said diaphragm for holding and releasing said valve.

8. In a milking mechanism, a pail, means for exhausting air from said pail, a valve having a port communicating with the interior of said pail, a conduit with which said port is adapted to communicate, a teat cup, a conduit connected with said teat cup, a resilient diaphragm connecting said conduits, means reciprocated by said diaphragm for engaging and disengaging said valve, said last named means being adapted for holding said valve in one position, and means for throwing said valve to a second position.

9. In a milking mechanism, a receptacle, means for exhausting air therefrom, a suction tube exhausted by said means through said receptacle, a teat cup connected with said tube, a valve mechanism for controlling communication between said receptacle and tube, and means operated by suction for holding said valve mechanism in the open position, said means being adapted for automatically releasing said valve mechanism upon the rise in said tube of pressure above that adapted for milking.

In witness whereof I have hereunto set my name this 3rd day of February, 1910, in the presence of the subscribing witnesses.

DAVID TOWNSEND SHARPLES.

Witnesses:
A. C. MACARTNEY,
H. B. CARLISLE.